May 17, 1938.  R. P. GLENN  2,117,951
ROTARY STEAM ENGINE
Filed April 2, 1937   4 Sheets-Sheet 1

Inventor
RUSSELL P. GLENN,

By Kimmel & Crowell
Attorneys

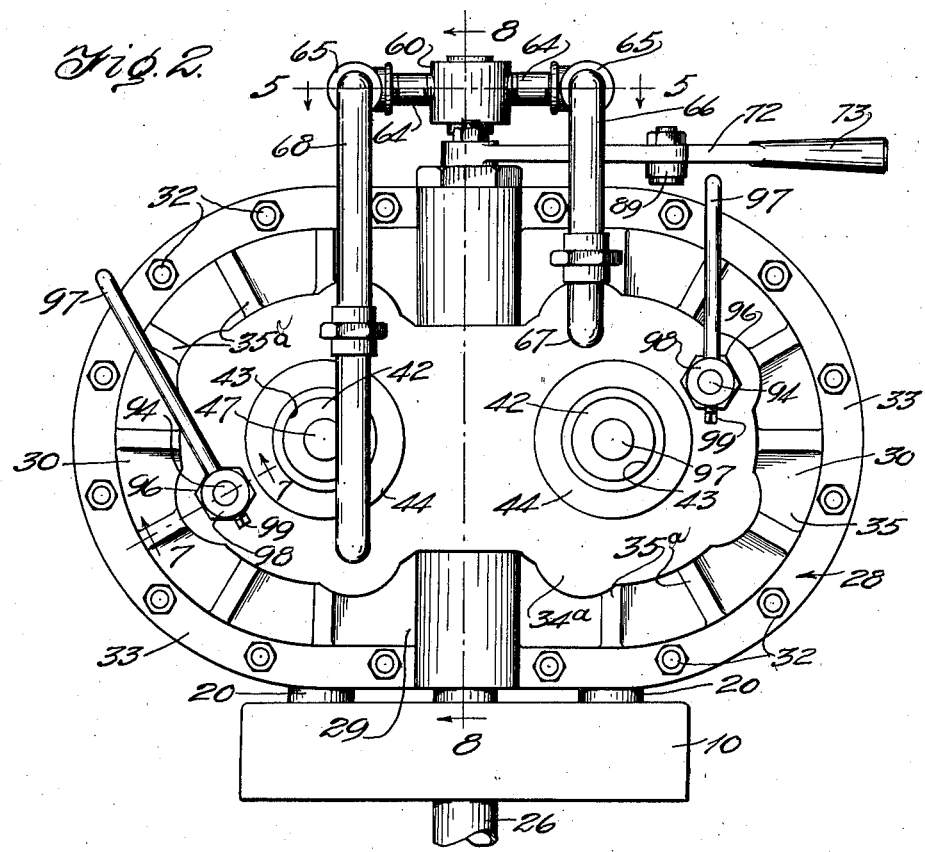

May 17, 1938.  R. P. GLENN  2,117,951
ROTARY STEAM ENGINE
Filed April 2, 1937  4 Sheets-Sheet 3

Inventor
RUSSELL P. GLENN,
By Kimmel & Crowell
Attorneys.

May 17, 1938.   R. P. GLENN   2,117,951
ROTARY STEAM ENGINE
Filed April 2, 1937   4 Sheets-Sheet 4

Inventor
RUSSELL P. GLENN,
By Kimmel & Crowell,
Attorneys

Patented May 17, 1938

2,117,951

UNITED STATES PATENT OFFICE 2,117,951

ROTARY STEAM ENGINE

Russell P. Glenn, Abilene, Tex.

Application April 2, 1937, Serial No. 134,627

5 Claims. (Cl. 121—70)

This invention relates to prime motors and has special reference to a rotary steam engine.

One important object of the invention is to provide a rotary steam engine having a novel arrangement of rotary elements therein.

A second important object of the invention is to provide a novel and improved construction of rotary element for such an engine.

A third important object of the invention is to provide a novel rotary steam engine wherein, by an improved arrangement of the parts, the rotary elements act to permit steam to flow into the engine during one part of the rotation of the rotary elements and to cut off the flow of steam during a second part of such rotation.

A fourth important object of the invention is to provide such an engine with means for initial admission of steam and with auxiliary means for a secondary admission of steam.

A fifth important object of the invention is to so arrange the rotary elements of the engine that they act as valves for controlling both the initial and secondary admissions of steam.

A sixth important object of the invention is to provide the auxiliary steam admission means with a novel valve arrangement whereby steam may be prevented from passing through such means.

A seventh important object of the invention is to arrange the parts of such an engine in a novel manner whereby the direction of operation may be reversed at will and to provide a novel steam passage and valve arrangement whereby such reversal of motion may be effected.

With the above and other objects in view, as will be presently apparent, the invention consists in general of certain novel arrangements of details and combinations of parts as hereinafter more fully described, illustrated in the accompanying drawings wherein is shown an embodiment of the invention, but it is to be understood that changes, variations and modifications may be resorted to which fall within the scope of the invention as claimed.

In the accompanying drawings like characters of reference indicate like parts in the several views, and:

Figure 2 is a front elevation thereof.

Figure 5 is a section on the line 5—5 of Figure 2.

Figure 1:
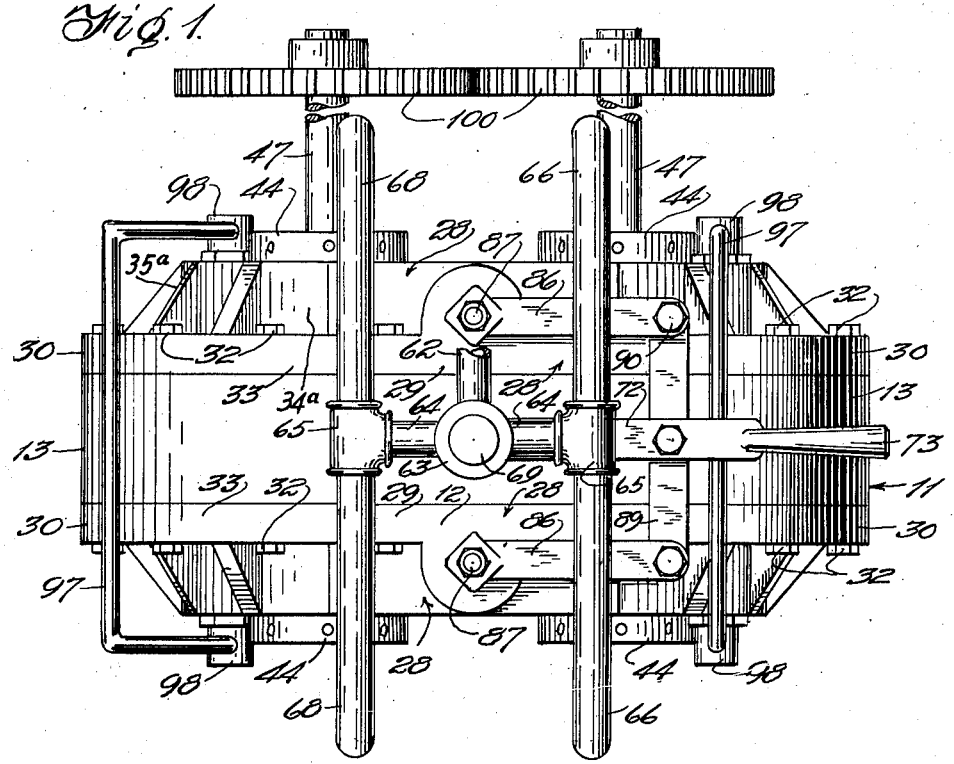
Figure 1 is a plan view of the engine forming the subject matter of this invention.

In the present embodiment of the invention there is disclosed a base 10 rectangular in plan and on this base is supported the engine proper.

The engine proper comprises a main or stator portion 11 of rectangular form in plan and comprising in elevation a central part 12 of rectangular prismatic form exteriorly and end portions 13 of semi-cylindrical form exteriorly. This portion 11 may be termed the cylinder-block. The cylinder-block 11 is bored to provide a pair of segmento-cylindrical chambers 14 concentric with the end portions 13 of the block and providing arcuate walls 15 at the opposite ends of the block. The chambers 14 meet in the transverse median plane of the cylinder-block and the walls 15 are prolonged inwardly on arcs 16 concentric of the chambers to meet also in this median plane. Thus the cylinder-block may be said to include a pair of intersecting cylinders of equal diameters and having parallel axes. Furthermore the walls 13 are connected outside of and in spaced relation to the extensions 16 by rectilinear wall portions 17 thus providing an upper transverse passage 18 and a lower transverse passage 19. As explained later, only the lower passage 19 has an operative function, the upper passage forming an idle and blind chamber. On the under side of the cylinder-block is a pair of spaced lugs 20 having tapped holes 21 extending upwardly therein. Bolt holes 22 are formed in the base 10 to align with the holes 21 and have countersunk lower ends 23. Bolts 24 extend through the holes 22 and are screwed into the holes 21, the heads of these bolts being housed in the countersinks as clearly shown in Figure 3. In casting the cylinder-block similar lugs (not shown) may be provided on its upper side and, if this be done it will be seen that the block will be symmetrical with reference to a plane passing through the axes of the two cylinders so that the block may be inverted from the position shown in Figure 3 without changing its functional arrangement. It is partly to this end that the upper passage 18 is provided, this becoming, upon inversion of the block, the functionally active passage and the passage 19 then becoming functionally inactive. The lower passage is provided with a pipe threaded opening 25, preferably central of its length, and in this opening 25 is screwed an exhaust pipe 26 which leads to any desired point for disposition of steam exhausted therethrough. The base 10 is provided with an opening 27 through which the pipe 26 passes. The front and rear faces of the cylinder-block 11 are parallel plane surfaces.

The front and rear of the cylinder-block are closed each by a head indicated in general at 28. These heads are of symmetrical construction and each consists of a central rectangular portion 29 and semi-cylindrical end portions 30. The inner faces 31 constitute plane surfaces and fit against the front and rear faces of the cylinder-block and are secured to the block by through bolts 32 which pass through peripheral flanges 33 formed on the heads 28 and through bolt holes 34 formed in the wall of the cylinder-block. Each of these heads 28 is provided with a relatively thick central portion 34ª forming an elongated part and with a relatively thinner portion 35 from which extend the peripheral flanges 33. The ends of the portion 34ª are symmetrically disposed about the axes of the cylinders and are additionally connected to the flanges 33 by radial ribs 35ª. Each head 28 is provided with a pair of bearing openings 36 concentric with the axes of the respective cylinders so that the openings in one head are axially aligned with the openings in the other head.

Mounted in each of the cylinders is a rotor 37. Each rotor consists of a body 38 of generally cylindrical form but having a peripheral substantially semi-circular gap or pocket 39. The lengths of these bodies 38 are such as to fit snugly between the heads 28 and each body 38 is provided at its opposite ends with a pair of aligned journals 40 fitting revolubly in the bearing openings 36 formed in the heads 28 and with the walls of said openings 36 provided with peripheral oil retaining and steam sealing grooves 41. Journal extensions 42 project axially from the journals 40 and engage in openings 43 formed by flanged retaining collars 44 which latter are screwed into outwardly disposed and internally threaded recesses 45 formed in the heads 28 at the outer ends of the bearing openings 36. Each rotor is provided with an axial opening 46 wherethrough extends a shaft 47, the rotor and its shaft being non-rotatably secured together by a key 48 or the like. The diameters of the rotors are such that, when assembled as just described, their cylindrical peripheries will have tangential contact at the median plane between the cylinders 14. Each of the rotors carries a piston 48ª consisting of a tubular member open at its opposite ends and having an inner wall 49 concavely arcuate on its exterior to fit the periphery of a rotor, an outer wall 50 convexly arcuate on its exterior to fit against the periphery of a cylinder and side walls 51 having exterior surfaces of involute, cycloidal or other gear tooth contour. These pistons are mounted on the rotors adjacent the gaps or pockets 39, each located at the same side of a respective pocket as may be seen from Figure 3. In order to mount these pistons each rotor is provided with a pair of radially extending tapped holes 52 wherein are screwed stud-bolts 53 which pass through suitable openings 53ª in the wall 49 of the piston and have nuts 54 screwed on their outer ends within the tubular piston. The nuts are passed into the pistons from one end of the latter and made to engage the bolts by a manual action, after which the nuts are screwed home by a suitable tool. It will now be seen that the two rotors and their pistons form a pair of meshing single toothed gears, the piston of each rotor engaging in the pocket of the other rotor as the rotors revolve. Because of this it is to be understood that the contours of the pistons and pockets are to be such that this action is permitted. Inasmuch as the forming of the pocket and mounting of the piston for each rotor causes the rotating structure to be unbalanced, provision is made for properly balancing this part for rotation and to that end each rotor is cast with suitable balancing pockets 55 adjacent the pockets 39 and on that side of the rotor from which the piston extends, these pockets being closed by plugs 56 machined to present a smooth surface at their outer ends so as to conform to the adjacent surface of the rotor. As shown the pockets 55 are lengthwise aligned, disposed transversely of the rotor and open at one end.

In order to provide for the admission of steam to the cylinders, each of the heads 28 has formed in the body 34 thereof a steam passage 57 arcuately concentric to the axis of a rotor. One of these passages is located at the upper and outer sector of one end of the head and the other is located at the lower and outer sector of the other end of the head. At the end of each passage 57 nearer the middle of the head there is provided a main steam inlet port 58 while at the opposite end of the passage there is provided an auxiliary steam inlet port 59, both of these ports opening into a cylinder and being spaced from the axis of the respective cylinder a distance less than the radius of the rotor-body but sufficiently far from said axis to open into the pocket 39 as the rotor revolves. The rotor, in its revolution thus acts alternately to open and close each port, the main and auxiliary ports being opened in succession and closed in succession.

Above the center of the cylinder-block is provided a steam valve including a body 60 having an inlet opening 61 wherein is screwed a steam supply pipe 62 receiving steam from any suitable source (not shown). The body 60 is likewise provided with an oppositely aligned pair of outlet openings 63 wherein are screwed the ends of a pair of nipples 64 having their outer ends screwed into the stem portions of T-fittings 65. In the run-ends of one of the fittings 65 is screwed a pair of steam pipes 66 each of which is screwed into a port 67 formed in a respective head and opening into the upper passage 57. Similarly, pipes 68 connect the other fitting with the lower passages 57 of the heads. Fitted in the body is a plug valve 69 having a pocket or passage 70 extending around a portion of its periphery. This valve 69 is provided on its lower end with a polygonal stem 71 whereon is fitted one end of a valve-lever 72 having an operating handle 73 at its free end. It may now be seen from Figure 5 that movement of the lever 72 to a position corresponding to the dash and dot line A will effect communication between pipe 62 and pipes 66 while movement of the lever to a position corresponding to line B will effect communication between pipe 62 and pipes 68.

Figure 8:
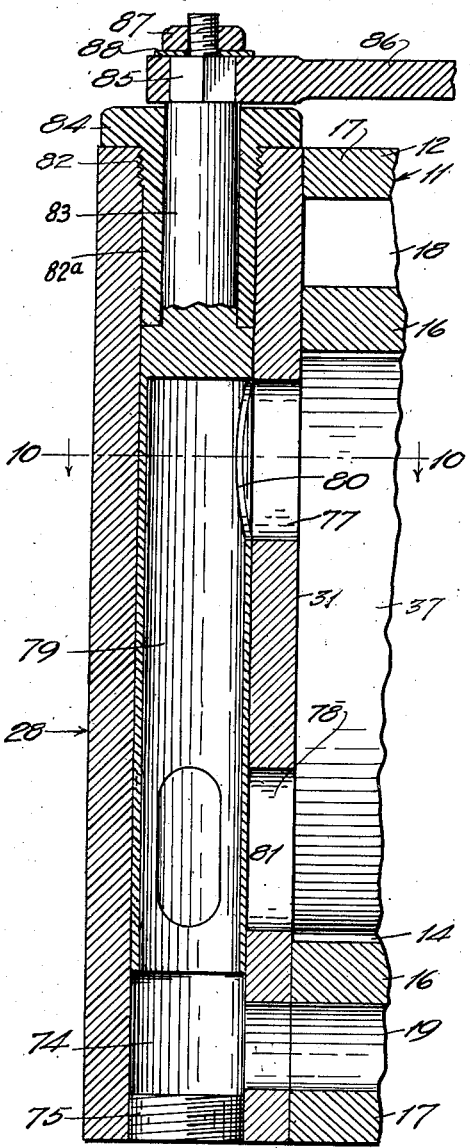
Figure 8 is an enlarged fragmentary section on the line 8—8 of Figure 2 and showing the exhaust valve position upon operation of the engine in one direction.
Figure 9:
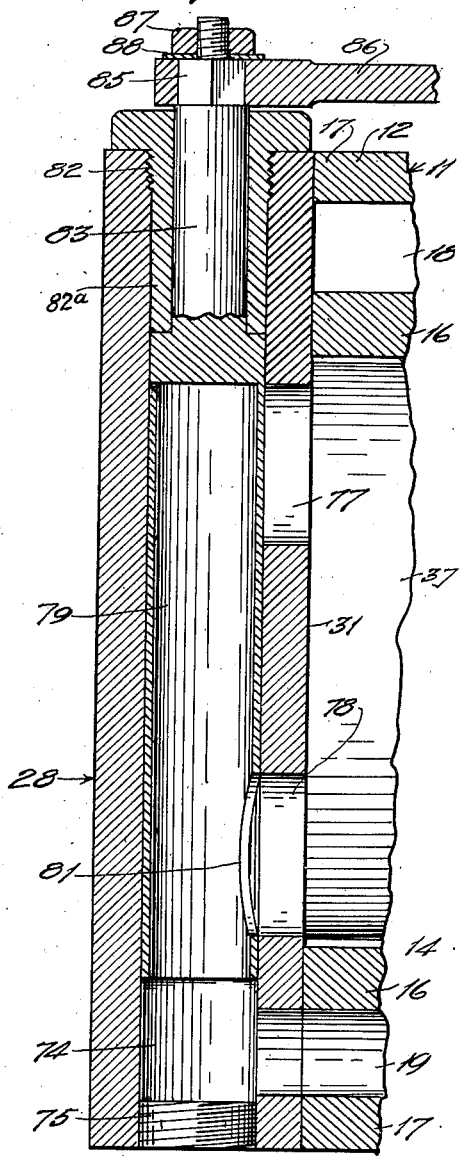
Figure 9 is a view similar to Figure 8 but showing the exhaust valve position upon operation of the engine in the opposite direction.
Figure 10:
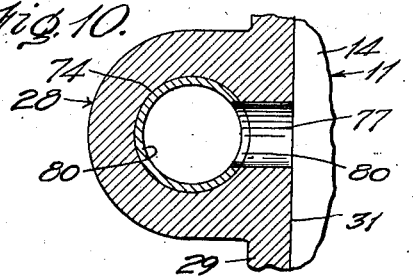
Figure 10 is a section on the line 10—10 of Figure 8.

Centrally of each of the heads 28 is a vertical cylindrical valve-chamber 74 extending from top to bottom of the head and closed at its bottom by a screw-plug 75. A port 76 affords communication between the lower end of the valve-chamber and an end of the exhaust passage 19. Each head is provided with an upper exhaust port 77 and a lower exhaust port 78, these ports being vertically elongated and being located centrally of the length of the head with the upper port sufficiently high above the contact line of the rotors to be clear of the rotor bodies and the lower port being located below such contact line and clear of the rotor bodies. A tubular valve-member 79 is located in each of the valve-chambers and is provided with an upper port 80 and a lower port 81, these ports being capable of being brought into and out of registration with the ports 77 and 78 by rotation of the valve and are angularly displaced with respect to each other so that when port 80 registers with port 77, port 81 is out of registry with port 78 and when port 81 registers with port 78, port 80 is out of registry with port 77. The upper end of the valve-chamber 74 is threaded at 82 to secure a bearing 82ª for a valve-stem 83 projecting above the head through a keeper 84 and provided at its upper end with a polygonal portion 85. A valve-lever 86 has one end fitted on the polygonal portion 85 and is there held as by the nut 87 and washer 88. The two levers 86 extend parallel to the lever 72 and these three levers are connected for simultaneous operation by a tie bar 89 secured to the levers as by bolts 90. The arrangement of the valves is such that upon the lever 72 being moved to position A of Figure 5 the exhaust valves will be in the position shown in Figure 9 so that exhaust will take place through port 78 and upon the lever 72 being moved to position B the exhaust valves will be in the position shown in Figure 8 and exhaust will take place through port 77. Thus, the single handle 73 controls both admission and exhaust and the valve 69 may be opened or closed to any desired extent so that the engine may be provided with a desired supply of steam.

Figure 6:
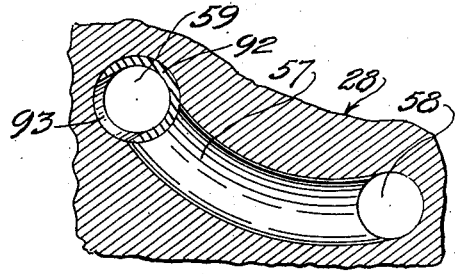
Figure 6 is a fragmentary section on the line 6—6 of Figure 4.
Figure 7:
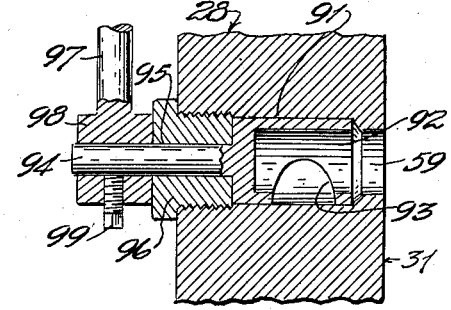
Figure 7 is an enlarged detail section on the line 7—7 of Figure 2.

Aligned with each of the ports 59 (Figures 6 and 7) is a valve-chamber 91 wherein is seated a tubular valve 92 open at its inner end to the port 59 and having a lateral port 93 which may be brought by rotation of the valve 92 into and out of registry with the passage 57. A stem 94 projects outwardly from this valve and passes through a suitable opening 95 in a valve bonnet or cap 96 screwed into the outer end of the chamber 91 to hold the valve 92 in place and prevent leakage of steam. These valves 92 are aligned oppositely each other in pairs in the two heads 28 and each aligned pair of valves is controlled by a yoke 97 which has the ends of its arms provided with apertured heads 98 fitting the valve-stems 94 of a pair of the valves 92. Set screws 99 or other suitable means are used to hold the yokes to the stems to rotate the valves as the yokes are swung from one position to the other. The yokes are swung outwardly and inwardly about the axes of and to provide for the opening and closing respectively of the valve 92. By this means the auxiliary steam ports may be opened or closed at will.

In order to cause the rotors to rotate in unison the shafts 47 have fitted thereto meshing gears 100 and either or both of these shafts may be fitted with suitable means to constitute a power take-off.

Figure 3:
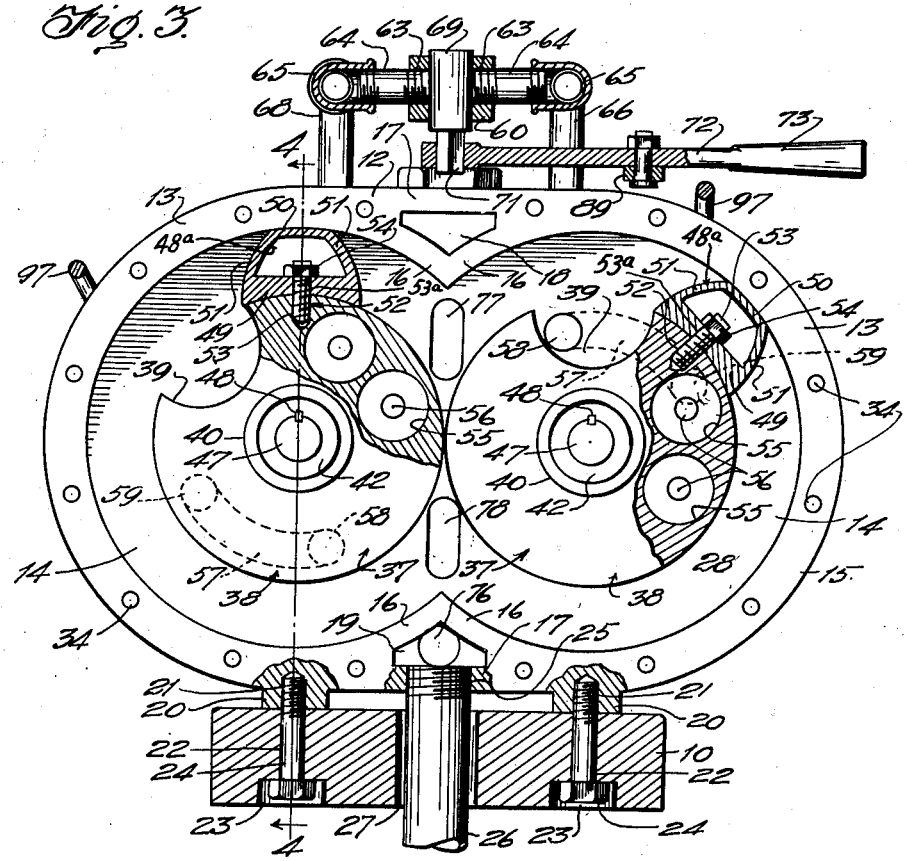
Figure 3 is a view from the front of the engine, the front head being removed and the remainder of the parts being shown partly in elevation and partly in section to better disclose the construction of the invention.
Figure 4:
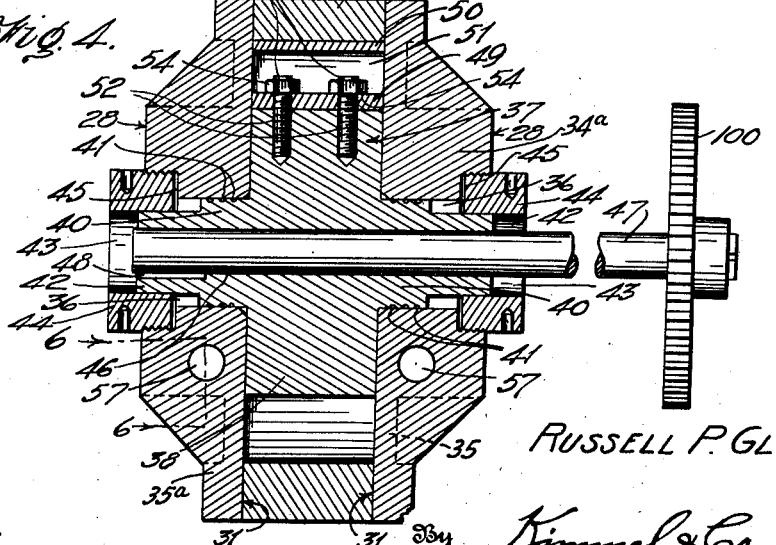
Figure 4 is a section on line 4—4 of Figure 3, the base being omitted.

In order to understand the operation of the engine let it be supposed that the parts are in the position shown in Figure 3. If the lever 72 be now moved to the position of line A in Figure 5 steam will enter the space above the rotors and between the pistons through the ports 58 so that the pistons will be forced apart. As the pistons move apart the ports 58 will be closed and, unless the upper ports 59 be opened by opening of their valves 92 by the yokes 97, no more steam will enter but the steam will continue to act by expansion. If, however, ports 59 are open then upon the pocket 39 registering therewith more steam will enter the space until cut off by the rotor whereupon the expansion force of the steam will act. Meanwhile the space below the rotors will decrease in volume and the fluid therein (air at starting and steam afterwards) will flow out through exhaust port 78. Due to inertia the rotors will continue to rotate until the ports 58 again open for a new supply of steam. If the lever 72 is moved to position B the engine will operate in reverse direction since the action of the rotors will be to successively open the lower ports 58 and 59, and the upper exhaust port 77 will be open and the lower exhaust port 78 closed. The upper and lower ports 58 of each head are termed primary intakes. The upper and lower ports 59 of each head are termed auxiliary intakes.

What is claimed is:

1. In a rotary engine, an elongated cylinder-body providing a pair of segmento-cylindrical chambers open at each end and merging into each other at the vertical median of said body, heads on said body for closing the ends of said chambers, said heads and body having coacting means to provide an exhaust channel below the point of mergence of said chambers, rotors revolubly mounted in said chambers and each having a peripheral pocket and a radially projecting piston adjacent each pocket, each of said heads having an upper and a lower primary and an upper and a lower auxiliary intake for each chamber within the annular area traversed by a pocket, steam supply lines opening into said intakes, a controlling valve common to said lines, each of said heads being formed with an upper and a lower exhaust port disposed in alignment with the point of mergence of said chambers, each of said heads at its vertical median being provided with a vertically disposed valve chamber permanently opening into said channel, a controllable tubular exhaust controlling valve within each valve chamber closed at its top, open at its bottom and formed with upper and lower ports disposed at an angle for selective registry with the exhaust ports in a head, and oppositely shiftable means for selectively controlling the direction of the drive of the engine, the said oppositely shiftable means being connected with the several valves for simultaneously shifting them in a like direction.

2. In a rotary engine, an elongated cylinder-body providing a pair of segmento-cylindrical chambers open at each end and merging into each other at the vertical median of said body, heads on said body for closing the ends of said chambers, said heads and body having coacting means to provide an exhaust channel below the point of mergence of said chambers, rotors revolubly mounted in said chambers and each having a peripheral pocket and a radially projecting piston adjacent each pocket, each of said heads having an upper and a lower primary intake for each chamber within the annular area traversed by a pocket, steam supply lines opening into said intakes, a controlling valve common to said lines, each of said heads being formed with an upper and a lower exhaust port disposed in alignment with the point of mergence of said chambers, each of said heads at its vertical median being provided with a vertically disposed valve chamber permanently opening into said channel, a controllable tubular exhaust controlling valve within each valve chamber closed at its top, open at its bottom and formed with upper and lower ports disposed at an angle for selective registry with the exhaust ports in a head, and oppositely shiftable means for selectively controlling the direction of the drive of the engine, the said oppositely shiftable means being connected with the several valves for simultaneously shifting them in a like direction, each of said heads being formed with an upper and a lower auxiliary intake for each of said chambers within the annular area traversed by a pocket, said auxiliary intakes for communication with said primary intakes and said chamber and normally closed to said primary intakes, and means for establishing communication between said primary intakes and said auxiliary intakes.

3. In a rotary engine of that type including an elongated cylinder-body providing a pair of segmento-cylindrical chambers opening at each end and merging into each other at the vertical median of said body, a rotor in each of said chambers, each rotor having a radially disposed pocket opening at the sides and outer edge thereof and a piston projecting from said outer edge in proximity to said pocket, the combination of a pair of heads for closing the ends of the said chambers, each of said heads being provided with an upper and a lower primary and an upper and a lower auxiliary intake for each chamber within the annular area traversed by a pocket, each of said heads being formed with upper and lower exhaust ports disposed in alignment with the points of mergence between said chambers, each of said heads at its vertical median being provided with a vertically disposed valve chamber permanently opening into said channel, a tubular exhaust controlling valve in each valve chamber, and each of said valves closed at its top, open at its bottom and formed with upper and lower ports disposed at an angle for selective registry with the exhaust ports in a head for changing the direction of rotation of the engine.

4. In a rotary engine of that type including an elongated cylinder-body providing a pair of segmento-cylindrical chambers open at each end and merging into each other at the vertical median of said body, and a rotor operating each chamber, the combination of heads for closing the ends of said chambers, each of said heads formed with an upper and a lower primary intake for each chamber, an upper and a lower auxiliary intake for each chamber, and upper and lower exhaust ports for each chamber, a channel leading from each primary intake to an auxiliary intake, a shiftable valve mounted in each auxiliary intake for normally closing the latter to a primary intake, and valve controlling means for selective registry with the exhaust ports in a head for changing the direction of rotation of the engine.

5. In a rotary engine of that type including an elongated cylinder-body providing a pair of segmento-cylindrical chambers merging into each other at the vertical median of the body, and a rotor operating in each chamber and having a pocket, the combination of a pair of heads for closing the ends of the chambers and having means coacting with said body to provide an exhaust channel below the point of mergence of said chambers, each of said heads formed with upper and lower controllable intakes for each of said chambers within the annular area traversed by a pocket, each of said heads being formed with an upper and a lower exhaust port disposed in alignment with the point of mergence of said chambers, each of said heads at its vertical median being provided with a vertically disposed valve chamber permanently opening into said channel, and a controllable tubular exhaust controlling valve within each valve chamber, said valve closed at its top, open at its bottom and formed with upper and lower ports disposed at an angle for selective registry with the exhaust ports in a head for changing the direction of rotation of the engine.

RUSSELL P. GLENN.